Jan. 23, 1968     E. C. TILLMAN     3,365,237

WHEEL ATTACHING DEVICE

Filed April 6, 1966

INVENTOR.
ERNEST C. TILLMAN
BY Jacobi & Davidson
ATTORNEYS.

United States Patent Office 3,365,237
Patented Jan. 23, 1968

3,365,237
WHEEL ATTACHING DEVICE
Ernest C. Tillman, 1242 Devon,
Corpus Christi, Tex. 78404
Filed Apr. 6, 1966, Ser. No. 540,622
1 Claim. (Cl. 301—39)

ABSTRACT OF THE DISCLOSURE

A dual wheel assembly for vehicles, such as passenger cars, trucks, trailers, and the like wherein an auxiliary wheel having a tire rim terminal flange is attached to the tire rim terminal flange of a wheel ordinarily mounted on a vehicle by an open-ended curved flexible steel band-like member which has flange engaging means on each of its peripheral edges; the flange engaging means on the band-like member are, respectively, engaged with the tire rim terminal flanges of the vehicle wheel and the auxiliary wheel, after which the ends of the band-like members are drawn together by a construction which decreases the spacing between the ends of the band-like member.

---

The present invention relates to wheels and particularly to a wheel attaching device or assembly for load carrying vehicles. The invention finds particular utility when used in conjunction with wheels of the type now conventionally employed on passenger cars, buses, trucks, trailers, etc., and is primarily concerned with the ready conversion of a single tire wheel to a dual tire wheel.

The need for a dual tire wheel is often necessitated by adverse ground conditions, such as, sand, mud, snow, etc., or by the occasional requirement that the vehicle support an abnormal load. There thus remains a need for a simple, efficient device that is universal in character and can readily be applied to, or detached from, conventional wheels.

More specifically, one of the primary objects of the invention is to provide a device or assembly which is durable, compact, light in weight and ready for immediate use by a simple mounting operation without first requiring the assemblage of the parts thereof or, to any material extent, the disassembly of conventional wheel parts, by the user, at the time the need for such device or assembly arises.

A further object of the invention is to provide a device or assembly conforming with the preceding primary objects of the invention which is so constructed that it may be applied to either of the front or the rear wheels of a vehicle.

A still further object of the invention is to provide a device or assembly of sufficiently low cost that it would be practical for a plurality of such devices to be kept readily available in order that more than one, and in some situations, even four of such devices may be employed, that is, one on each wheel should conditions warrant it.

Another object of the invention is to provide a dual wheel attaching assembly which requires no change to existing equipment.

Still another object of the invention is to provide a dual wheel attaching assembly which mounts on the rim of a vehicle wheel and provides therewith an interlock which insures against lateral shift of the assembly.

The invention will be better understood, and objects other than those set forth above will become apparent, after reading the following detailed description thereof. Such description refers to the annexed drawings presenting preferred and illustrative embodiments of the invention.

Figures 1, 2:
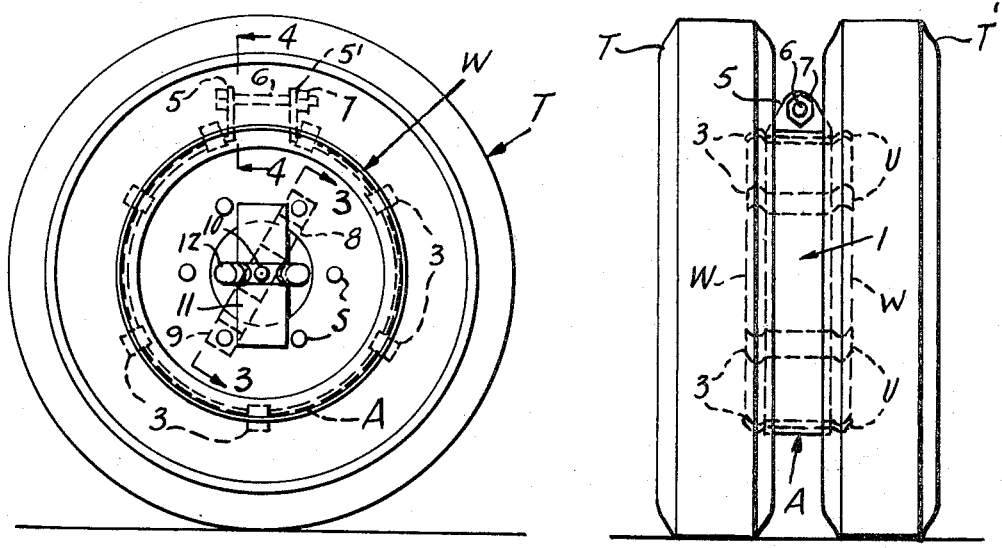
FIGURE 1 is an elevational view of dual wheels and tires mounted thereon with the attaching device and centering means therefor of the instant invention applied thereto.
FIGURE 2 is an end elevation of the invention as seen applied between the tires.

Referring now to the drawings, it is to be initially noted that FIGURE 1 shows a conventional vehicle wheel assembly which includes a wheel W supported by the usual studs S that normally extend from the conventional brake drum. The wheel has mounted thereon a conventional tire T. An auxiliary wheel assembly W', provided with a tire T' is shown in FIGURE 2 as attached securely to the wheel W by means of the attaching device A which forms the basis of the instant invention, and makes it possible for a single wheel to be converted to a dual wheel.

It is to be initially noted that the attaching device includes an open-ended band-like member 1 formed of any well known material that has sufficient strength to resist the stresses to which it may be subjected as the vehicle to which it is applied is operated over roadways in normal use. One example of such a material may be a band of one-eighth inch steel rolled or otherwise formed into circular shape with a circumference which is approximately the same as the circumference of the rim of the wheel to which it is to be applied.

A plurality of wheel engaging hook-like members, preferably in the form of cleats 3, 3' are arranged to extend in spaced circumferential relationship from opposite edges 2, 2' of the band-like member 1. These hook-like members or cleats may be formed as integral parts of the band-like member 1. Another arrangement which may be economically and successfully employed to provide the hook-like members or cleats involves forming them in pairs extending in opposite directions from a central body member 4. The central body member with its pair of oppositely extending cleats may be designated a cleat unit, U. Each cleat unit, U, is attached in spaced relationship along the band and such spacing is preferably uniform in order to provide for uniform distribution of stresses. Any well known and convenient method of securing these units U to the band-like member 1, such as, welding, riveting, bolting, or the like, may be successfully employed. The hook-like members or cleats 3, 3' are shaped in cross-section to conform to the shape of conventional wheel tire rim terminal flanges F.

Each of the ends 5, 5' of the band-like member 1 are bent outwardly preferably in parallel relationship. Means are provided to decrease the spacing of the opening between the ends of the band-like member and this means may, for example, comprise any well known tightening means and preferably takes the form of a bolt 6 and associated nut 7.

In use of the embodiment of the invention illustrated in FIGURES 1, 2 and 4 to 6, nut 7 is loosened on bolt 6 an amount to effect sufficient spacing of the ends 5, 5' of the band-like member 1 and enlargement of the circumference of said band-like member to make it possible to insert the hook-like members or cleats that extend from one of the edges 2 or 2' of the band-like member 1 into the space between the rim of the wheel W which is normally provided on a vehicle and the tire T mounted thereon. After attachment of the band-like member to the wheel W, a second or dual wheel W' provided with tire T' is attached to the band-like member by forcing the exposed hinge-like members or cleats to enter the space between the tire T' and the rim of the wheel W' on which tire T' is mounted.

Figure 3:
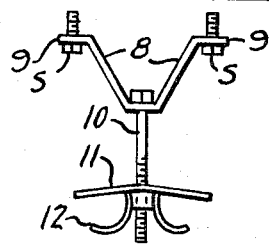
FIGURE 3 is a sectional view, taken along the line 3—3 of FIGURE 1, showing a centering device, which forms a part of the assembly, in elevation.
Figure 5:
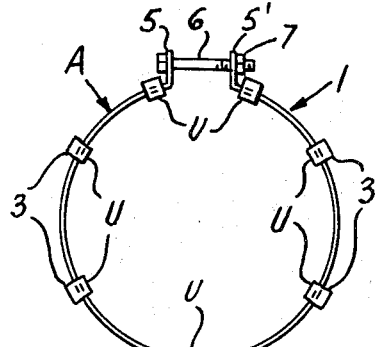
FIGURE 5 is a side view.
Figure 4:
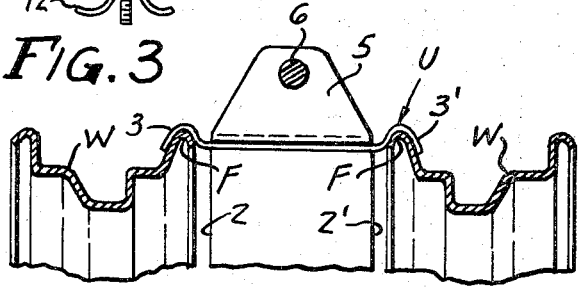
FIGURE 4 is a sectional view, taken along the line 4—4 of FIGURE 1.
Figure 6:
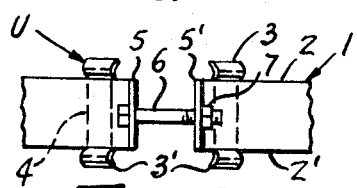
FIGURE 6 is a fragmentary plan view of the securing device.

In order to facilitate mounting the wheel W' with its tire T' on wheel W, a centering device C illustrated in FIGURE 3 may be provided. The centering device may, for example, take the form of a somewhat U-shaped member 8 provided with outwardly extending legs 9. An opening is provided in each leg 9 and these openings are spaced apart a distance equal to the distance between a pair of diametrically opposed studs S. A bolt 10 is arranged to extend forwardly from the U-shaped member 8 and it loosely supports a wheel clamping plate 11. The clamping plate 11 is retained on the bolt 10 by any well known securing means which may be, for example, a wing nut 12. In use the centering device is secured to wheel W by a pair of studs S. After removal of wing nut 12 and plate 11 wheel W' is mounted on bolt 10. Plate 11 is then reapplied to the bolt 10 and bears against and makes substantial surface contact with the central portion of wheel W'. As the wing nut 12 is tightened on bolt 10, wheel W' is guided as well as forced toward band-like member 1 until the hinge-like members or cleats mounted on the band-like member enter into the space between wheel W' and tire T' and secure wheel W' to the band-like member 1.

In actual practice, it is not contemplated that the clamp C be designed to be of a strength that it will lend itself to permanent attachment for supporting a dual wheel. It is contemplated that it be formed of any light weight, inexpensive material that may only be satisfactory for carrying out its intended centering function. Notwithstanding this fact, it is to be understood that the use of the centering device as a support is not to be excluded should such use be found to be necessary or even desirable.

Figure 7:
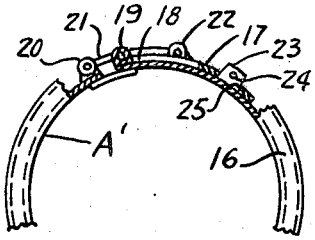
FIGURE 7 is a side view, shown partially in section, of a modification of the device shown in FIGURES 1–6.
Figure 8:
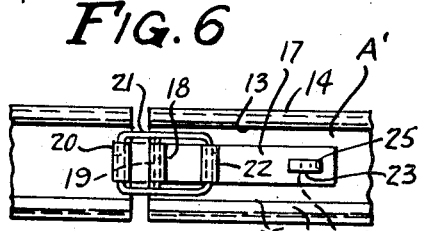
FIGURE 8 is a fragmentary plan view of the device shown in FIGURE 7.

In the modified form of applicant's invention illustrated in FIGURES 7 and 8, an open-ended band-like member A' of size, shape and material similar to the band-like member A of the preferred form of invention is provided. In this form of the invention the spaced hook-like members present in the preferred form have been replaced by a pair of continuous flanges, each of which is of hook-like shape in transverse cross-section. More specifically, for example, the rim 13 of band A is provided with a continuous hook-like flange 14 and rim 15 is provided with a continuous hook-like flange 16. These continuous flanges are inserted in the space between the wheel rim W and tire T, and the space between the wheel rim W' and tire T' in the same manner that the hook-like members or cleats of the preferred form are inserted in the space between a wheel and its associated tire. In some instances, where it is desirable that the assembly be permanently secured to a spare tire, one of the flanges 14 or 16 is made of greater transverse extent than the other so that the assembly will be more securely held between the wheel rim and its associated tire. Another feature which is desirable in this modification but not essential is the specific arrangement for decreasing the spacing between the ends of the band-like member A'. It comprises a lever 17 having one of its faces of a curvature corresponding to the curvature of the face of the band-like member A'. This lever 17 has one of its ends 18 pivoted at 19 adjacent one end of the band-like member. Pivotally connected at 20 adjacent the other end of the band-like member A' is a hollow lever member 21 which, preferably, may be a conventional chain link or buckle. The hollow lever 21 is pivotally connected at 22 between the ends of lever 17. A tab 23, provided with an opening 24, projects from the surface of the band A'. The lever 17 is also provided with an opening 25 so positioned that when lever 17 lies in contact with the band-like member A' tab 23 extends into and through opening 25. Any well known means, preferably a pin, may be provided for insertion through opening 25 to retain the lever 17 in place.

After reading the foregoing detailed description, it will be apparent that the objects set forth initially have been successfully achieved. Accordingly, what is claimed is:

1. A dual wheel assembly comprising in combination a conventional wheel assembly including a brake drum, wheel mounting studs extending from said brake drum, a wheel having a tire rim terminal flange positioned on said studs and secured on said studs by nuts; an auxiliary wheel assembly having a tire rim terminal flange; an open-ended curved flexible steel band-like member provided with a wheel terminal flange engaging means on each of its peripheral edges, respectively, snugly engaging the terminal flanges of said conventional wheel assembly and said auxiliary wheel assembly, and each of said terminal flange engaging means being of a shape to correspond with the shape of the tire rim terminal flange; means for decreasing the spacing between the ends of said band-like member comprising a lever having one of its faces of a curvature corresponding to the curvature of the band-like member and provided with an elongated opening extending longitudinally thereof pivoted at one of its ends adjacent one end of said band-like member, a wire buckle pivotally connected to the other end of said band-like member and pivotally connected to the other face of the lever, a tab extending transversely from said band-like member and located thereon so as to be engaged within said elongated opening when said lever is positioned in contacting realtionship with said band-like member and its ends are in substantially contacting relationship, an opening extending transversely through said tab, and a pin frictionally engaged in said opening retaining said lever in contacting relationship with the band-like member.

References Cited

UNITED STATES PATENTS

| 895,975 | 8/1908 | Davies | 301—39 |
| 3,068,049 | 12/1962 | Smith | 301—38 X |

FOREIGN PATENTS

| 11,176 | 1909 | Great Britain. |
| 17,474 | 5/1928 | Netherlands. |
| 195,059 | 12/1919 | Canada. |

RICHARD J. JOHNSON, *Primary Examiner.*